Dec. 22, 1953   F. C. SCHWANEKE   2,663,552
POWER MIXER UNIT
Filed Sept. 22, 1951   2 Sheets-Sheet 1
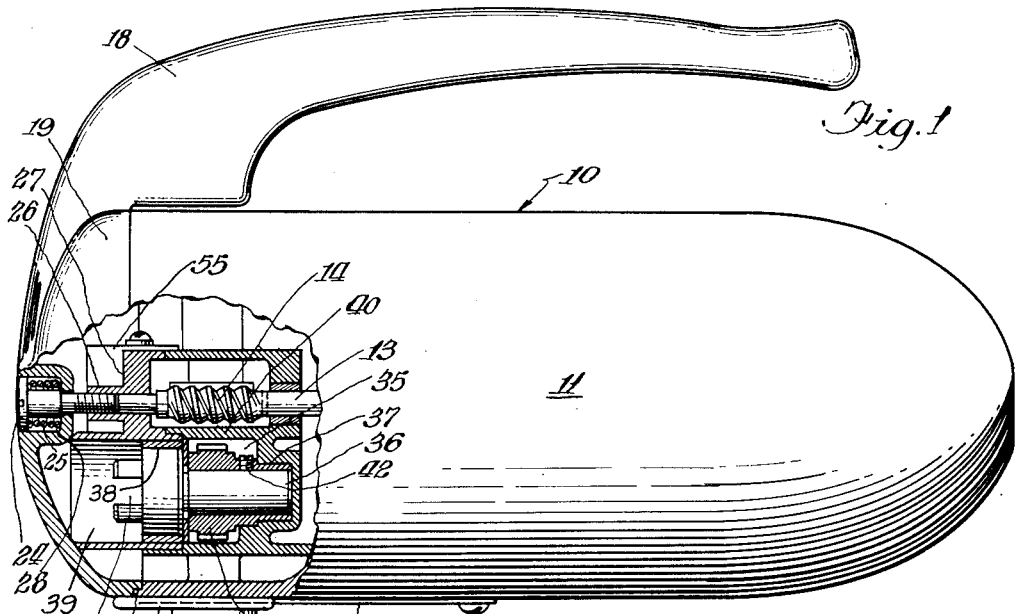
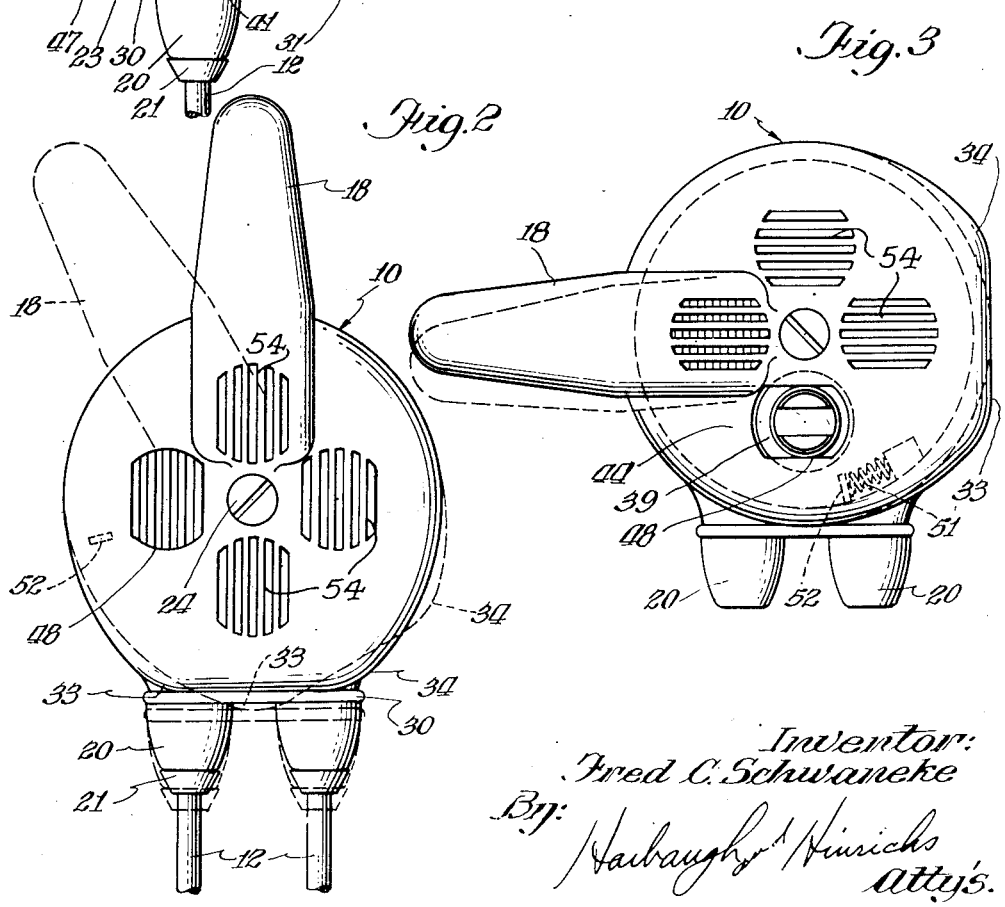
Inventor:
Fred C. Schwaneke
By: Harbaugh & Hinrichs
attys.

Dec. 22, 1953 — F. C. SCHWANEKE — 2,663,552
POWER MIXER UNIT
Filed Sept. 22, 1951 — 2 Sheets-Sheet 2
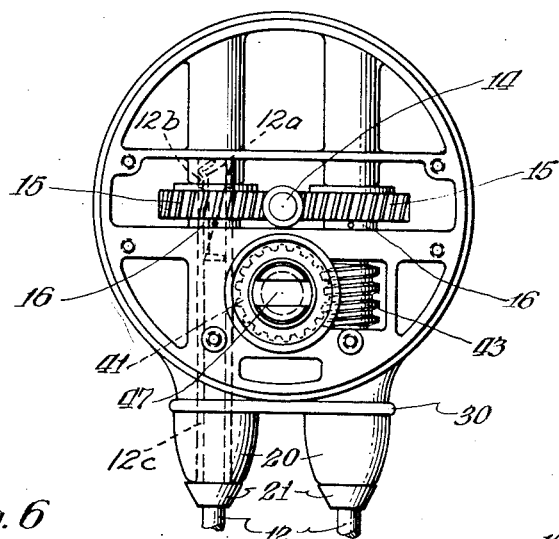
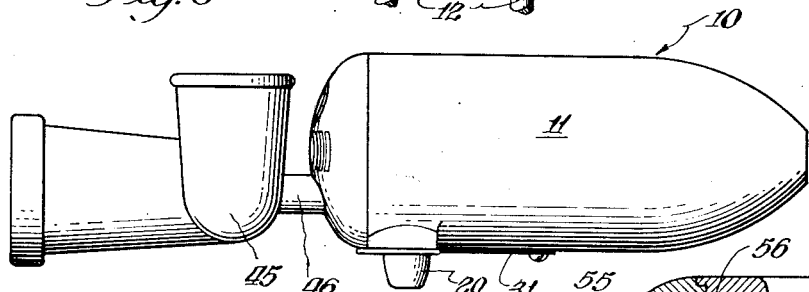
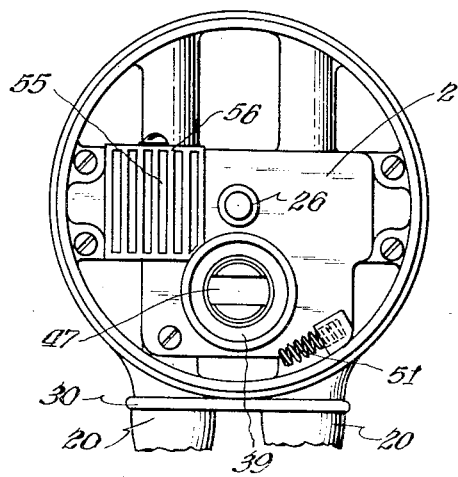
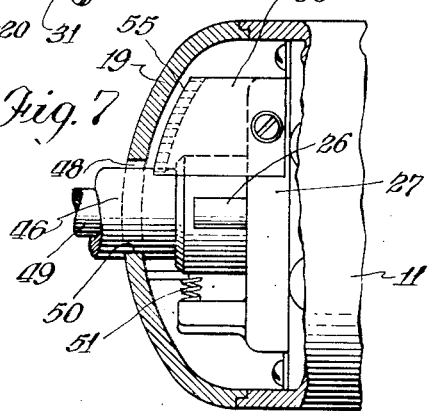
Inventor:
Fred C. Schwaneke
By: Harbaugh and Hinrichs
attys.

Patented Dec. 22, 1953

2,663,552

UNITED STATES PATENT OFFICE 2,663,552

POWER MIXER UNIT

Fred C. Schwaneke, Chicago, Ill., assignor to Dormeyer Corporation, Chicago, Ill., a corporation of Illinois Application September 22, 1951, Serial No. 247,794

16 Claims. (Cl. 259—1)

1

This invention relates generally to electrically powered household mixers and more particularly to a mixer power unit having an improved beater release and power take-off shaft arrangement.

The food mixer power unit of this invention is similar in some respects to that disclosed in the Knapp Patent No. 2,048,455 for Food Mixing Device with Beater Ejector, reference to which is hereby made; but the beater ejector mechanism of this invention constitutes a substantial improvement over the Knapp ejector inasmuch as it accomplishes all of the results of that ejector and employs a greatly simplified mechanism which is more positive in its action and more rugged in its inherent construction.

Another feature of the mixer power unit of this invention is that a power take-off shaft for attachments is conveniently provided on the front end of the power unit, and the various parts of the beater release are arranged so that the power take-off shaft elements do not interfere with the beater release elements. Certain elements of the beater release mechanism are employed to provide a conveniently actuated locking device for the mixer attachment such as a juicer, grinder or other power tool driven by the power take-off shaft. Moreover, the beater release elements are employed to enclose the power take-off socket when it is not used.

Accordingly, one object of this invention is to provide a food mixer motor unit for driving a pair of interdigitating beaters having a novel mechanism for releasing said beaters from drive engagement, the release mechanism being positive in its action yet not interfering with a power take-off mechanism which is also provided in the motor unit and so constructed as to permit the beaters to be locked in drive position during use of the power take-off shaft.

Another object is to provide a convenient means for locking a tool attachment in the power take-off socket, the locking means being actuated by the same handle which operates the beater release mechanism.

A further object is to provide a power unit having adequate ventilation openings at the front end which are open to provide a free flow of air over the gear housing and the internal parts of the unit regardless of whether the unit is being used to drive the beaters or an attachment.

Other objects and advantages of the mixer power unit of this invention will present themselves to those familiar to the art on reading the following specification in conjunction with the drawing and the appended claims.

2

In the drawings:

Fig. 1 is a side view, partially in section, of a food mixer power unit provided with a beater release and power take-off according to this invention;

Fig. 2 is a front end view of the unit;

Fig. 3 is another end view showing the handle in the position it occupies when the power take-off shaft is being used;

Fig. 4 is an end view of the power unit with the handle and rotatable end bell as well as certain internal covers removed to show the gear arrangement;

Fig. 5 is an end view similar to Fig. 4, but with only the handle and end bell removed;

Fig. 6 is a side view of the power unit with an attachment tool mounted in the power take-off socket; and Fig. 7 is a top view, partially in section, showing the power take-off socket arrangement.

A fundamental concept of this invention is to provide a food mixer power unit having removable interdigitating beaters, a power take-off shaft on the front end of the unit, and a beater ejector mechanism comprising a rotatable end bell at the front end of the unit carrying a handle which actuates a moveable beater ejecting element when rotated and which serves as a closure and an attachment lock for the power take-off socket. The rotatable end bell is provided with cam surfaces which act directly upon a resiliently supported element having engaging sleeves to force the beaters downwardly in their drive spindles to effect their release, as the handle is rotated.

To aid in understanding the invention, the beater release mechanism will be described first, followed by a description of the power take-off mechanism. It is to be understood, however, that the two mechanisms are very closely interrelated and that the parts of one mechanism perform dual functions in the second.

The power unit 10 comprises an external casing 11 which is adapted to be supported on a pedestal (not shown) at one end, and carries a pair of removable beaters 12 at the other end. The casing 11 contains an electric motor (not shown) whose armature 13 is provided with a worm 14. This worm is disposed between two worm wheels 15 carried by the beater drive spindles 16. These spindles constitute sleeves which are journalled in spindle bearings provided at the front end of the unit and the bores of the sleeves receive the upper ends of the beater shafts 12.

Resilient retainer and clutch means are provided to hold the beater shafts 12 in the spindles 16 in the positions shown in Figs. 1, 2 and 4. The retaining and clutching arrangement is conventional and may be accomplished in any one of a number of different ways. For example; a single resilient element 12a can be provided on each beater shaft which engages a kerf 12b in the spindle to key the two together and to prevent downward movement of the shaft in the spindle 12c. Another arrangement is to cross-kerf the upper ends of the shafts and provide a pin at the top of the spindle for engaging the kerf, independent resilient means being utilized to prevent the beaters from dropping out of the spindles.

Thus, the beater spindle relationship is such that the beaters are automatically retained in the spindles in drive relationship when they have been pushed all the way into the spindles, and the drive relationship is broken by moving the shafts downwardly in the spindles to unclutch the shafts and release them so that they are free to drop out of the spindles.

The beater release mechanism of this invention provides a convenient means for simultaneously moving both beater shafts downwardly in their spindles to declutch them from drive relationship and permit them to drop out of the spindles. The release mechanism comprises a handle 18, a rotatable end bell 19 to which the handle is attached and a pair of resiliently mounted ejector sleeves 20 which cooperate with the shoulder elements 21 provided on the shafts 12. The end bell 19 is substantially circular and is journalled for rotation about the long axis of the casing in a circular groove or recess 23 provided on the end of the casing 11. To hold the end bell 19 in engagement in the groove 23, a screw 24 and spring 25 are employed. The screw is received in a threaded sleeve 26 attached to a cover plate 27 which encloses the gears. The head of the screw 24 and the spring are received in a small socket 28 provided in the front end of the bell 19 in such fashion that the spring urges the bell towards the casing 11. When in its upright position the handle 18 also serves as a carrying handle for the power unit permitting the unit to be used separately from its supporting base if desired.

The ejector sleeves 20 are attached to a cam follower element, preferably formed integrally therewith, which is in turn secured to the end of a leaf spring 31 whose other end is bolted to the bottom of the casing 11. Thus, the elements 20 are normally held in the position shown in Fig. 1 but may be bent downwardly from the casing to the position shown in broken lines in Fig. 2. When this is done, the ends of the elements 20 engage the shoulders 21 on the beater shafts 12 moving the shafts downwardly a short distance and disengaging them from the spindles, the frictional drag exerted by the elements 20 immediately begins to slow the beater shafts 12 when they have been unclutched, and the beaters are effectively released from drive engagement and free to drop out of the spindles 16.

To effect downward movement of the release elements 20, a cam surface 33 is provided on the end bell 19. The cam action of this surface as the handle 18 is rotated is best shown in Fig. 2. On examination of this figure, it will be apparent that the surface 33 projects outwardly beyond the nominal diameter of the housing 11 and engages the cam follower element 30 as the handle 18 is moved from the normal position shown in solid lines in Fig. 2, to the position shown in dotted lines. To balance the appearance of the end bell a similar projecting surface 34 is provided on the opposite side of the unit. Thus, as the handle 18 is moved away from the upright position, rotating the end bell 19, the cam surface 33 engages the follower plate 30 to move the sleeve elements 20 downwardly and eject the beaters. Further rotation of the handle beyond the position shown in the broken lines of Fig. 2 permits the plate 30 to rise carrying the elements 20 back to their normal position. Consequently, the beaters may be ejected either by moving the handle downwardly away from the upright position or by raising it from a position wherein it extends to the side of the mixer towards the upright position. This arrangement also permits the beaters to be installed when the handle is in the horizontal position as is sometimes desirable.

The handle 18 is normally secured in the upright position by the upward force of the plate 30 against the two cam surfaces 33 and 34. Thus there is no need to provide a detent or latch for this purpose. Conventional stop means (not shown) are provided to prevent the handle 18 from being rotated past the upright position, in the clockwise direction as viewed in Fig. 2.

The power take-off shaft 36 is disposed directly below the worm 14 and is journalled in bearings 37 and 38. The smaller bearing 37 is pressed into a socket 35 provided in the die-cast gear housing 40. The larger bearing 38 is pressed into a larger circular socket opening 39 provided in the gear housing cover plate 26. The front end of the shaft 36 is kerfed to provide a clutch drive for the driven shaft of the attachment tool which is inserted in the front end of the socket 39. The shaft 36 carries a worm wheel 41 which is attached thereto by a set screw 42 and meshes with a worm gear 43 provided on one of the beater spindles 16. Thus the worm 14 on the motor armature drives the worm wheel 15 on the spindle which in turn drives the worm 43 to rotate the worm wheel 41 on the power take-off shaft 36. The two worm drives effect a great reduction in speed from the armature shaft to the power take-off shaft with a consequent large increase in power at the shaft 36.

The attachment supporting socket 39 is preferably cylindrical but may be provided with flat sides to prevent torque reaction rotation of the attachment such as the grinder 45 (Fig. 6) which is supported solely by the socket 39. In the preferred illustrated embodiment the torque reaction is absorbed by an end bell 19, the opening 48 in bell 19 through which the attachment boss extends being flat sided. The driven shaft 49 (Fig. 7) of the attachment is separately journalled inside of the flat sided boss 46 which is received in the socket 39, the end of the driven shaft being shaped to fit into the kerf portion 47 provided in the end of the power take-off shaft 36 to establish a drive relationship between the power take-off shaft 36 and the driven shaft 49. Thus, when an attachment is supported in the socket 39, its driven element is clutched to the shaft 36 so as to be rotated at low speed and high power, and its stationary elements are supported and locked against rotation by the socket 39 and the end bell 19.

The opening 48 in the end bell 19, instead of being directly beneath the handle 18, is located 90° away from the handle. Thus, the power take-off socket 39 is exposed only when the handle is rotated 90° from the normal position as shown in Fig. 3.

As shown in Fig. 3, the opening 48 in the end bell is disposed slightly eccentric to the socket 39 when the handle is in the position shown in solid lines. When the handle is seven or eight degrees below this position, as shown in broken lines, the opening 48 is concentric with the socket 39. The reason for this is that the handle 18 and bell 19 are utilized to latch the attachment boss 46 in the socket 39 against axial displacement.

When the end bell 19 is in the position shown in solid lines the curved edge of the opening 48 engages a groove 50 provided in the side of the boss 46, and the boss is securely locked against withdrawal. To hold the handle in this position a small spring 51 supported by the cover plate 27 and a lug 52 on the end bell 19 are employed. The lug 52 is so located as to engage the spring when the handle 18 is horizontal. When the handle 18 is pushed downwardly farther to the position indicated by broken lines in Fig. 3, the lug 52 compresses the spring 51, the spring "going solid" when the opening 48 is concentric with the socket 39. When the handle 18 is released, of course, the end bell 19 moves to the locked position of Fig. 3. Thus to insert or withdraw the attachment boss 46 the handle 18 is simply pressed downwardly to the limit of travel, returning to the locking position upon release. It will be appreciated that a detent carried by the bell or actuated thereby could be used instead of the edge of the opening 48 to latch the boss 46 if desired.

If the end of the attachment boss 46 is beveled the edge of the opening 48 may be cammed sideways on insertion of the boss without pressing the handle 18 below the horizontal. It will be also appreciated that the handle will serve as a readily available quick release of the attachment if in an emergency quickness is urgent.

A novel arrangement has been provided for ventilating the forward end of the power unit and also for camouflaging the socket opening 48 in the end bell 19. This is done by providing three louver openings 54 in the end bell 19. The three openings 54 are spaced at right angles to one another and to the unlouvered opening 48. These openings permit the free flow of air through the housing 11 to cool the motor and the gearing, additional vent openings (not shown) being provided at the rear end of the casing 11. Immediately behind the position occupied by the opening 48 when the handle is in the normal upright position, a plurality of louvers or gratings 55 are located. These louvers are provided in an L-shaped element 56 which is attached to the gear housing cover plate 27, a space being provided immediately behind the louvers 55 so that air may pass readily through them into the casing 11. Thus, when the handle is in the upright position, it appears as though four sets of louvers are provided in the end bell 19 as shown in Fig. 2. Actually, however, only three sets are built integral with the bell, the fourth set being a fixture immediately behind the bell in the element 56. When the handle is rotated to the position shown in Fig. 3, the louvers 55 are in registration with one set of louvers 54 in the end bell so that, actually, but three ventilation springs are in use during use of an attachment. This louver arrangement is quite desirable in that it not only provides adequate ventilation at all times but also serves to prevent foreign objects from getting into the interior of the casing. Moreover, the take-off socket 39 is closed during mixing so that objects cannot be inserted into it inadvertently.

The operation of the power unit has been described in the foregoing description of the components, but a résumé may prove helpful in fully understanding the invention.

Assuming that the power unit 10 is as shown in Fig. 2, and that a mixing operation has been completed, the operator simply pushes the handle 18 downwardly to the position shown by broken lines in Fig. 2 to rotate the end bell 19. This causes the cam surface 33 to depress the element 30 and move the sleeves 20 downwardly unclutching the beaters 12 from drive relationship and releasing them so that they are free to drop out of the spindles 16. The handle 18 may then be returned to the upright position or moved to a horizontal position to expose the power take-off socket 39. In either event the beaters 12 may be reinserted at any time and they will be clutched to the spindles 16 and retained therein.

The beater ejector mechanism is, of course, operative when the mixer is running and may be used to break the drive to the beaters in the event that a spatula, spoon or finger should be caught therein while the motor unit is being operated when attached to the stand.

To use the power take-off shaft 36 to drive an attachment such as the grinder 45, juicer or shredder, the handle 18 is moved to the position shown in broken lines in Fig. 3. The boss 46 on the attachment is then inserted into the socket 39, and the handle 18 is released to allow the edge of the opening 48 to spring into the retaining groove 50 provided in the side of the boss 46 to lock the attachment to the unit 10. The mounting of the attachment is preferably undertaken while the power unit is running, for this facilitates clutching of the driven shaft end into the kerf 47.

On completion of the use of the attachment, the handle 18 is again pressed downwardly to withdraw the edge of the opening 48 and release the boss 46 so that the attachment may be removed from the unit. To close the power take-off socket the handle is returned to the upright position carrying one set of the louvers 54 to a location over the opening.

From the foregoing description, it will be apparent that a superior power unit has been provided which is simply constructed, easy to operate and otherwise fulfills the objects set forth herein.

Various changes or modifications in addition to those set forth herein and such as will present themselves to those familiar with the art may be made without departing from the spirit of this invention, whose scope is defined by the following claims.

What is claimed is:

1. A mixer power unit having a casing open at the front end, a rotatable end bell having a power take-off socket opening therein and covering said open end, a handle attached to said end bell for rotating same, a cam surface on the periphery of said end bell normally disposed near the bottom of same, a pair of beater spindles within said casing, a pair of beaters, means releasably retaining the shafts of said beaters in said spindles in drive relationship, a beater ejector element resiliently mounted on the bottom of the front end of said casing and adapted to be engaged by said cam and moved downwardly as said handle is moved downwardly from an upright position, said beater ejector element having a sleeve portion surrounding each of said beaters which engages abutting shoulders on the beaters to force same downwardly out of said spindles when the ejector element moves downwardly, and a power take-off socket in said unit to one side of the center of said end bell, said opening being so located in said end bell as to be aligned with said socket when said handle is rotated away from said upright position past the position at which said cam is operative.

2. A mixer power unit having a casing open at the front end, a rotatable end bell having a power take-off socket opening therein and covering said open end, a handle attached to said end bell for rotating same, cam means on said end bell, a pair of beater spindles within said casing, a pair of beaters, means releasably retaining the shafts of said beaters in said spindles in drive relationship, a beater ejector element adapted to be actuated by said cam means and moved downwardly as said handle is moved downwardly from an upright position, said beater ejector element having a sleeve portion surrounding each of said beaters which engages abutting shoulders on the beaters to force same downwardly out of said spindles when the ejector element moves downwardly, and a power take-off socket in said unit, said socket opening being so located in said end bell as to be aligned with said socket when said handle is rotated away from said upright position past the position at which said cam means actuates the ejector element.

3. A mixer power unit having a casing open at the front end, a rotatable end bell having a power take-off socket opening therein and covering said open end, a handle attached to said end bell for rotating same, cam means on said end bell, a beater spindle within said casing, a beater, means releasably retaining the shaft of said beater in said spindle in drive relationship, a beater ejector element adapted to be engaged by said cam means and moved downwardly as said handle is moved downwardly from an upright position, and a power take-off socket in said unit disposed eccentrically of said end bell, said opening being so located in said end bell as to be aligned with said socket when said handle is rotated away from said upright position past the position at which said cam means is operative to eject said beater.

4. A mixer power unit having a casing open at the front end, a rotatable end bell covering said open end and having a plurality of louvered openings therein and an unlouvered opening, said openings being equally spaced apart, a handle attached to said end bell for rotating same, a cam surface on the periphery of said end bell normally disposed near the bottom of same, a pair of beater spindles within said casing, a pair of beaters, a power take-off shaft between said spindles, said unlouvered opening being disposed adjacent to said socket when said handle is horizontal, a stationary louvered element disposed behind said unlouvered opening when said handle is upright, means releasably retaining the shafts of said beaters in said spindles in drive relationship, and a beater ejector element resiliently mounted on said casing and adapted to be engaged by said cam and moved downwardly as said handle is moved downwardly from an upright position, said beater ejector element having a portion at each of said beaters which engages the beater to force same downwardly out of its spindle when the ejector element moves downwardly, said cam being so located as to actuate the ejector during movement of said handle from said upright to said horizontal position.

5. A mixer power unit having a casing open at the front end, a rotatable end bell covering said open end and having a plurality of louvered openings therein and an unlouvered opening, said openings being equally spaced apart, a handle attached to said end bell for rotating same, a cam surface on said end bell normally disposed near the bottom of same, a beater spindle within said casing, a removably receivable power take-off shaft in said spindle at the front end of said unit behind said bell, said unlouvered opening being disposed adjacent to said socket when said handle is horizontal, a stationary louvered element disposed behind said unlouvered opening when said handle is upright, and a beater ejector element adapted to be engaged by said cam surface and moved downwardly as said handle is moved downwardly from an upright position, said beater ejector element at said cam being so located as to actuate the ejector during movement of said handle from said upright to said horizontal position.

6. A mixer power unit having a casing open at the front end, a rotatable end bell covering said open end, a handle attached to said end bell for rotating same, a cam surface on the periphery of said end bell normally disposed near the bottom of same, a pair of beater spindles within said casing, a pair of beaters, means releasably retaining the shafts of said beaters in said spindles in drive relationship, and a beater ejector element resiliently mounted on the bottom of the front end of said casing and adapted to be engaged by said cam and moved downwardly as said handle is moved downwardly from an upright position, said beater ejector element having a sleeve portion surrounding each of said beaters for engaging abutting shoulders on the beaters to force same downwardly out of said spindles when the ejector element moves downwardly.

7. A mixer power unit having a mixing device detachably held in working position, a handle on a rotary spindle attached to a rotatable element closing the front end of said unit, said handle being adapted for carrying the mixing unit when in an upright position and being movable away from said position, a cam surface on said element disposed on the bottom of said power unit when the handle is in said upright position and an ejector element movably mounted on the bottom of said unit and having a cam follower surface thereon cooperating with said cam, said element also having a surface thereon for engaging said mixing device to move same downwardly to detach same when said handle is moved away from said upright position to cause said cam to move the ejector element.

8. A mixer power unit having a mixing device detachably held in working position, a handle pivotally supported upon the front end of said unit and adapted for carrying the mixing unit when in an upright position, a cam surface on said handle normally disposed on the bottom of said power unit, and an ejector element resiliently mounted on the bottom of said unit and having a cam follower surface thereon cooperating with said cam, said element also having a surface thereon for engaging said mixing device to move same downwardly to detach same when said handle is moved away from said upright position to cause said cam to move the ejector element.

9. A mixer power unit having a mixing device detachably held in working position, a handle pivotally supported upon the front end of said unit, a cam surface on said handle disposed on the bottom of said power unit, and a movable ejector element mounted on the bottom of said unit and having a cam follower surface thereon cooperating with said cam, said element also having a surface thereon for engaging said mixing device to move same downwardly to detach same when said handle is moved away from a normal position to cause said cam to move the ejector element.

10. In a mixer power unit the combination including a housing having an open end, a driven shaft enclosed by the housing, a power take-off means operatively engaging the driven shaft and positioned within the housing, a bell movably mounted on the housing to close said end thereof, said bell having a plurality of slotted portions and one opening therein, a slotted member secured to the housing normally in alignment with the opening for the passage of air, and means for moving the bell relative to the housing to move the opening into alignment with the power take-off means.

11. In a mixer power unit the combination including a housing having an open end, a driven shaft enclosed by the housing, a power take-off means operatively driven by said driven shaft and located within the housing near the open end, an element movably mounted on the housing to close said end thereof, said element having an opening therein, a member secured to the housing in normal alignment with the opening to ventilate the housing through the opening, and means for moving the element relative to the housing to move the opening into alignment with the power take-off means.

12. In combination with a drive shaft, a motor and a housing enclosing said shaft and motor, a speed reducing unit secured within the housing and in operative engagement with the shaft, a power take-off socket for the reducing unit positioned within the housing, a bell rotatably mounted on the housing to close one end thereof, said bell having a plurality of slotted portions and one opening therein, said portions and openings being disposed at equal angles to each other, a slotted plate secured to the housing in alignment with the opening for the passage of air, and means for moving the bell to move the opening from a position adjacent to the slotted plate to a second position in alignment with the socket.

13. In combination with a drive shaft, a motor and a housing enclosing said shaft and motor, a speed reducing unit secured within the housing and in operative engagement with the shaft, a power take-off socket for the reducing unit and positioned within the housing, an element rotatably mounted on the housing to close one end thereof, said element having an opening therein, a plate secured to the housing normally in alignment with the opening for the passage of air, and means for moving the bell so that the opening moves from a normal position adjacent to the plate to a second position in alignment with the socket.

14. In combination with a drive shaft, a motor and a housing enclosing said shaft and motor, a speed reducing unit secured within the housing and in operative engagement with the shaft, a power take-off socket for the reducing unit positioned within the housing, an element movably mounted on the housing to close one end thereof, said element having an opening therethrough for ventilating the housing, a slotted plate secured to the housing in alignment with the opening, means for moving the element to move the opening from a position adjacent to the slotted plate to a second position in alignment with the socket, means for locking an attachment in said socket, and means actuated by motion of said element for releasing said locking means.

15. In a mixer power unit the combination including a housing having an open end, a driven shaft enclosed by the housing, a power take-off means operatively engaging the driven shaft and positioned within the housing, an element movably mounted on the housing to close one end thereof, said element having an opening therein for ventilating the housing, means for moving the element relative to the housing to move the opening into alignment with the power take-off means, a retractable detent for locking an attachment in operative engagement with the power take-off means, and means actuated by slight movement of said element for retracting said detent to release the attachment.

16. In a mixer power unit the combination including a housing having an open end, a driven shaft enclosed by the housing, a power take-off means operatively engaging the driven shaft and positioned within the housing, said housing having a power take-off socket surrounding said means for supporting an attachment, a bell movably mounted on the housing to close one end thereof, said bell having a plurality of slotted portions and one opening therein slightly larger than said socket for the passage of air, a slotted member secured to the housing normally in alignment with the opening, means for moving the bell relative to the housing to move the opening into alignment with the power take-off means, a retractable detent for locking the attachment in said power take-off socket, and means on said bell for retracting said detent when said bell is moved a short distance beyond a position where the opening is in register with said socket.

FRED C. SCHWANEKE.

References Cited in the file of this patent

UNITED STATES PATENTS

| Number | Name | Date |
| --- | --- | --- |
| 1,868,587 | Richards | July 26, 1932 |
| 2,048,455 | Knapp | July 21, 1936 |
| 2,293,959 | Wright | Aug. 25, 1942 |
| 2,312,125 | Setterlund | Feb. 23, 1943 |
| 2,552,972 | Jepson | May 15, 1951 |